(12) United States Patent
Chiara

(10) Patent No.: US 12,107,540 B2
(45) Date of Patent: Oct. 1, 2024

(54) VENTILATED MULTILAYER SOLAR PANEL WITH DYNAMIC DIGITAL FILTER

(71) Applicant: Fabrizio Chiara, San Francesco al Campo (IT)

(72) Inventor: Fabrizio Chiara, San Francesco al Campo (IT)

( * ) Notice: Subject to any disclaimer, the term of this patent is extended or adjusted under 35 U.S.C. 154(b) by 85 days.

(21) Appl. No.: 17/758,736

(22) PCT Filed: Jan. 12, 2021

(86) PCT No.: PCT/IB2021/050186
§ 371 (c)(1),
(2) Date: Jul. 13, 2022

(87) PCT Pub. No.: WO2021/144686
PCT Pub. Date: Jul. 22, 2021

(65) Prior Publication Data
US 2023/0053794 A1 Feb. 23, 2023

(30) Foreign Application Priority Data

Jan. 16, 2020 (IT) .......................... 102020000000679

(51) Int. Cl.
*H02S 40/42* (2014.01)
*H02S 20/23* (2014.01)
(Continued)

(52) U.S. Cl.
CPC ............ *H02S 40/425* (2014.12); *H02S 20/23* (2014.12); *H02S 20/26* (2014.12); *H02S 40/20* (2014.12)

(58) Field of Classification Search
CPC .................................................. H02S 40/00–44
See application file for complete search history.

(56) References Cited

U.S. PATENT DOCUMENTS

| 2012/0120643 A1* | 5/2012 | Meng | ................... H10K 19/201 362/183 |
| 2015/0083195 A1* | 3/2015 | Gilbert | ................... F24S 10/40 126/650 |

(Continued)

FOREIGN PATENT DOCUMENTS

| EP | 3 280 044 A1 | 2/2018 |
| JP | 2005116834 A * | 4/2005 |

(Continued)

OTHER PUBLICATIONS

English Machine Translation of JP 20050116834A (Year: 2005).*

(Continued)

*Primary Examiner* — Kourtney R S Carlson
(74) *Attorney, Agent, or Firm* — Workman Nydegger

(57) ABSTRACT

A ventilated multilayer dynamic digital filter for photovoltaic panels includes a LED front panel, an intermediate panel having a photovoltaic surface, and a rear panel, the panels indirectly overlapping each other so that interspaces are created between the panels which are configured to allow the heat to circulate within the digital filter. Described herein is also the use of the digital filter for exterior cladding of facades and/or roofs of buildings, with the possibility of changing the patterns/textures of the cladding and improving the energy efficiency of a building.

6 Claims, 1 Drawing Sheet

(51) Int. Cl.
*H02S 20/26* (2014.01)
*H02S 40/20* (2014.01)

(56) References Cited

U.S. PATENT DOCUMENTS

2017/0170776 A1* 6/2017 Janowski ................ H02S 20/26
2020/0144960 A1* 5/2020 Davy ....................... E06B 9/24

FOREIGN PATENT DOCUMENTS

| TW | 201338185 A * | 9/2013 | ........... B60Q 3/0213 |
| WO | 2010/141580 A2 | 12/2010 | |
| WO | 2010/141580 A3 | 12/2010 | |
| WO | WO-2016192703 A1 * | 12/2016 | ......... H01L 31/0521 |
| WO | 2017/029379 A1 | 2/2017 | |
| WO | WO-2017220847 A1 * | 12/2017 | ............... F21K 9/90 |

OTHER PUBLICATIONS

English Machine Translation of WO2016/192703A1 (Year: 2016).*
English Machine Translation of TW201338185A (Year: 2013).*
International Search Report and Written Opinion dated Mar. 24, 2021, issued in PCT Application No. PCT/IB2021/050186, filed Jan. 12, 2021.
International Preliminary Report on Patentability dated Jul. 19, 2022, issued in PCT Application No. PCT/IB2021/050186, filed Jan. 12, 2021.

* cited by examiner

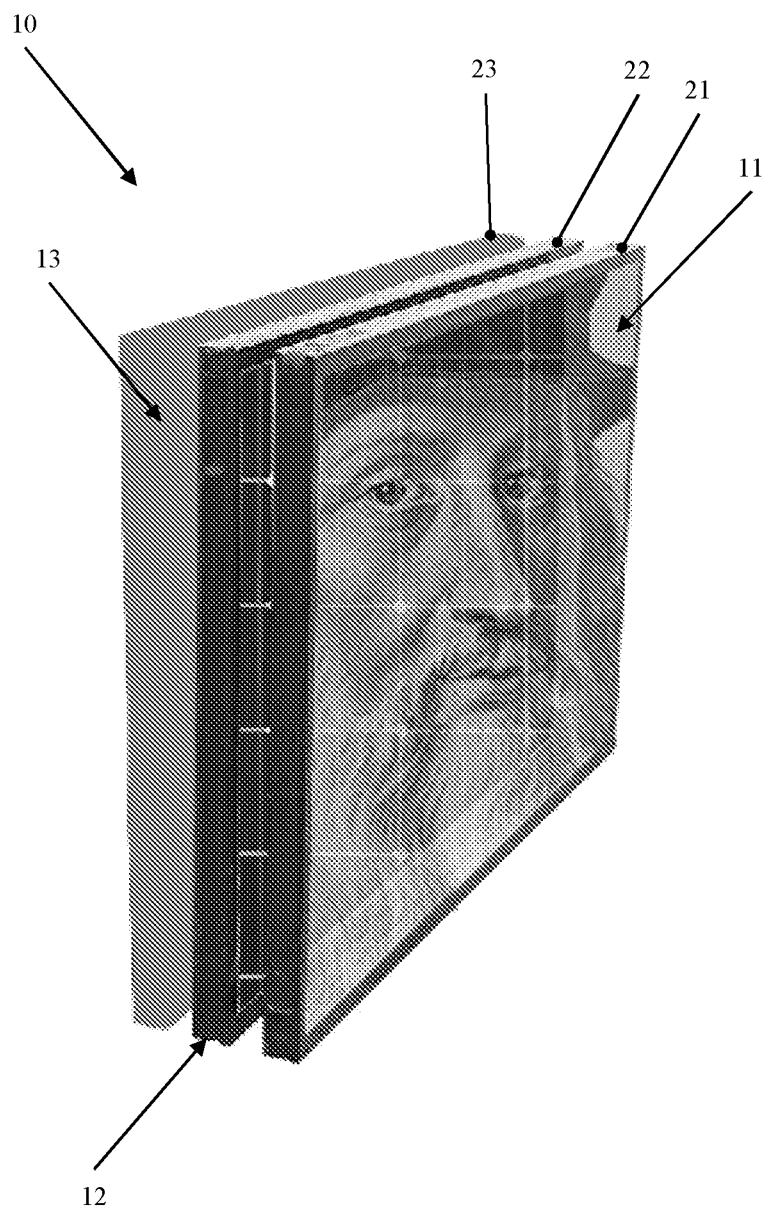

VENTILATED MULTILAYER SOLAR PANEL WITH DYNAMIC DIGITAL FILTER

BACKGROUND OF THE INVENTION

1. The Field of the Invention

The present invention relates to a ventilated multilayer dynamic digital filter for photovoltaic panels, in particular a filter comprising a digital screen performing filtering and aesthetic functions, and to a panel with a photovoltaic surface overlapping the screen.

2. The Relevant Technology

To date, transparent or semi-transparent LED digital screens are known which are configured for installation, for example, in shops or display areas, and which, since such structures are less complex than traditional screens, permit saving display and advertising space and permit the communication of static or dynamic graphic representations, while at the same time allowing the viewer to see beyond the display and the light to pass through it.

The solution known in the art, however, suffers from the drawback that such screens can only operate under particular temperature conditions, since they comprise electric and electronic parts that are liable to damage.

It is also known that advertising structures are widely spread and installed which adopt the photovoltaic technology in order to generate the electric energy necessary for illuminating the advertising board at night, or to allow it to operate by supplying power to its electromechanical actuators, thus avoiding the need for laying cables and connecting to the public grid, and hence reducing the environmental impact of the installation.

Nevertheless, said known solution is subject to problems in terms of high aesthetic impact and deterioration of the photovoltaic surface due to the effects of UV rays and heat affecting the life of silicon and of the other elements making up the photovoltaic surface, and also suffers from the problem that in many areas it may not be used because of architectural, historical and landscape constraints.

SUMMARY OF THE INVENTION

It is one object of the present invention to overcome such problems by providing a ventilated multilayer dynamic digital filter for photovoltaic panels which allows reducing the aesthetic impact through a better integration into the application context (buildings and other applications) thanks to the capability of reproducing images with any type of texture or pattern.

It is another object of the digital filter of the invention to reduce, through suitable shielding, the adverse effect of UV rays on the photovoltaic panel, thus extending the life of the latter.

It is a further object of the present invention to improve the efficiency of the photovoltaic panel by ventilation, which reduces the risk of overheating of the photovoltaic panel by dissipating the heat while at the same time preventing ice formation, thereby ensuring an even temperature resulting in a beneficial effect on optical transmittance and hence on the overall electric efficiency of the panel.

It is yet another object of the present invention to provide a ventilated multilayer dynamic digital filter for photovoltaic panels which is strong and durable, which facilitates maintenance work, and which provides installation flexibility, since it can withstand high loads and can therefore be positioned on roofs or at ground level.

The above objects and other goals and advantages of the invention, which will become clear in light of the following description, are achieved through a ventilated multilayer dynamic digital filter for photovoltaic panels as set out in the independent claim. Some preferred embodiments and non-obvious variations of the present invention are set out in the dependent claims.

It is understood that all the appended claims are an integral part of the present invention.

It will become immediately apparent that what is described herein may be subject to innumerable variations and modifications (e.g., in shape, dimensions, arrangements and parts having equivalent functionality) without departing from the protection scope of the invention as set out in the appended claims.

BRIEF DESCRIPTION OF THE DRAWINGS

The present invention will be described in detail below through a preferred embodiment thereof, which is only provided by way of non-limiting example with reference to the annexed drawings, wherein:

FIG. 1 shows a perspective view of a ventilated multilayer dynamic digital filter for photovoltaic panels according to the present invention.

DETAILED DESCRIPTION OF THE PREFERRED EMBODIMENTS

With reference to the FIGURE, the ventilated multilayer dynamic digital filter 10 for photovoltaic panels according to the invention comprises a front panel 11 comprising a LED grid or a series of parallel LEDs, an intermediate panel 12 comprising a photovoltaic surface, and a rear panel 13, said panels 11, 12, 13 indirectly overlapping each other.

Preferably, the front panel 11 comprises a semi-transparent LED screen that comprises a LED grid or a series of parallel LEDs, the empty spaces in the LED grid or between the series of LEDs being configured to allow the light to pass through the front panel 11, so that it will hit the photovoltaic surface of the intermediate panel 12 without preventing the images reproduced on the front panel 11 from being perceived as full and definite, with a level of semi-transparency and/or transparency comprised between 30% and 95%. In particular, the percentage ratio between the empty spaces and the spaces occupied by the LEDs of the semi-transparent LED screen is preferably comprised between 30% and 95%.

Preferably, the multilayer dynamic digital filter 10 comprises a frame 21, 22, 23 positioned on the perimeter of each panel 11, 12, 13, the frame 21 of the front panel 11 being in contact with the frame 22 of the intermediate panel 12, which is in turn in contact with the frame 23 of the rear panel 13 so as to create interspaces between the panels, said interspaces being configured to allow the heat to circulate within the multilayer dynamic digital filter 10 in order to prevent both overheating and ice formation; preferably, the frames 21, 22, 23 of the front panel 11 in contact with each other are connected by means of hinges, so that it can be opened like a book in order to inspect the interspaces between the panels 11, 12, 13, e.g., for cleaning and service purposes.

The front panel 11 may be made of shatterproof transparent material, so as to make the structure of the ventilated multilayer dynamic digital filter 10 strong and resistant to atmospheric events or acts of vandalism, as well as to particularly high loads, e.g., for roof or ground installation. In particular, as far as the building field is concerned, the multilayer dynamic digital filter 10 of the invention may be used for assembling prefabricated houses and for exterior cladding of facades and/or roofs, with the possibility of changing the patterns/textures of the cladding and improving the energy efficiency of a building.

The ventilated multilayer dynamic digital filter 10 for photovoltaic panels according to the invention offers the following advantages:
- the semi-transparent LED screen permits the passage of light, which is transformed into energy by the intermediate photovoltaic panel;
- the energy thus produced can be either used for reducing the energy consumption of the screen or stored for other uses;
- the LED grid creates a protection for the intermediate photovoltaic panel which, since the panel is hit by UV rays to a lesser extent, will extend the life of the silicon and of the other components of the panel while reducing their temperature, so that the panel will be more efficient in operation;
- the air chambers provided in the interspaces reduce the temperature within the structure by dissipating the heat, thereby making the photovoltaic panel more efficient when exposed to the sun and improving the operating conditions of the LED screen while reducing the risk of overheating;
- the heat circulating within the interspaces during the cold seasons prevents ice formation and improves the performance of the digital screen by keeping the operating temperature more stable.

The preferred embodiments of the invention described herein may of course be subject to further modifications and variations without departing from the inventive idea. In particular, it will be immediately apparent to those skilled in the art that numerous functionally equivalent variations and modifications will fall within the protection scope of the invention, as highlighted in the appended claims, wherein any references between brackets should not be understood to limit the claims themselves. Furthermore, the word "comprising" shall not exclude the presence of elements and/or steps other than those listed in the claims. The article "a" or "an" before an element shall not exclude the presence of a plurality of such elements. The simple fact that some features are mentioned in dependent claims shall not imply that a combination of such features cannot be used to advantage.

The invention claimed is:

1. A ventilated multilayer dynamic digital filter, comprising:
   a light-receiving front panel comprising a semi-transparent LED screen that comprises a LED grid or a series of parallel LEDs;
   a rear panel;
   an intermediate panel disposed between the front panel and the rear panel and comprising a photovoltaic surface;
   wherein said front, intermediate and rear panels indirectly overlap each other so that a first interspaces is created between the front panel and the intermediate panel and a second interspace is created between the rear panel and the intermediate panel, the first and second interspaces allowing heat to circulate within the digital filter, wherein empty spaces in the LED grid or between the series of parallel LEDs allow light to pass through the front panel and hit the photovoltaic surface of the intermediate panel.

2. The ventilated multilayer dynamic digital filter according to claim 1, further comprising a frame positioned on a perimeter of each panel, the frame of the front panel being in contact with the frame of the intermediate panel, which in turn is in contact with the frame of the rear panel, so as to create the first and second interspaces between the panels.

3. The ventilated multilayer dynamic digital filter according to claim 2, wherein the frames of each panel are in contact with each other and are connected together by hinges, so that the digital filter can be opened like a book in order to inspect the first and second interspaces between the panels.

4. The ventilated multilayer dynamic digital filter according to claim 1, wherein the front panel is made of shatterproof transparent material, so as to make the structure of the digital filter sufficiently strong for roof or ground installation.

5. A use of the ventilated multilayer dynamic digital filter according to claim 1 comprises the digital filter being used for exterior cladding of facades and/or roofs of buildings.

6. The use of the ventilated multilayer dynamic digital filter according to claim 5, wherein patterns or textures of the cladding may be changed.

* * * * *